Figure 1:
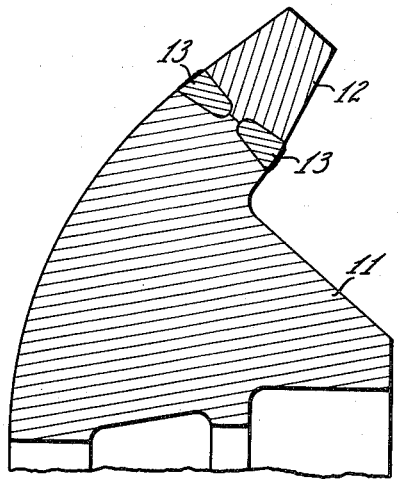

Oct. 11, 1960  E. GROSS  2,955,353
FABRICATION OF LARGE STRUCTURAL MEMBERS AND METHOD THEREFOR
Filed Jan. 18, 1956

Inventor
Emil Gross
by Richard R. Mybeck
Attorney

United States Patent Office 2,955,353
Patented Oct. 11, 1960

2,955,353

FABRICATION OF LARGE STRUCTURAL MEMBERS AND METHOD THEREFOR

Emil Gross, Wauwatosa, Wis., assignor to Allis-Chalmers Manufacturing Company, Milwaukee, Wis.

Filed Jan. 18, 1956, Ser. No. 560,046

3 Claims. (Cl. 29—469)

This invention relates generally to a means for and method of fabrication and more particularly to a means for and method of joining large metallic structural members when one of the members is composed of one of the new high yield strength high tensile strength structural materials and the other member is composed of a relatively lower grade material such as ordinary rolled or cast carbon steel.

One example of the new high yield strength high tensile strength structural material (herein also referred to as "high grade material") embraced by the present invention is the steel alloy developed by the U.S. Steel Corporation and identified to the trade as "Carilloy T–1" or simply "T–1" steel. A typical composition of such a material contains from 0.10 percent to 0.20 percent carbon, from 0.60 percent to 1.30 percent manganese, up to 0.035 percent phosphorus, up to 0.040 percent sulfur, from 0.15 percent up to 0.35 percent silicon, from 0.70 percent up to 1.0 percent nickel, from 0.40 percent up to 0.80 percent chromium, from 0.40 percent up to 0.60 percent molybdenum, from 0.03 percent up to 0.10 percent vanadium, from 0.15 percent up to .050 percent copper, from 0.002 percent up to 0.006 percent boron and the remainder iron. The material is further characterized by the following physical properties: ultimate tensile strength, 105,000 p.s.i.; yield strength, 90,000 p.s.i.; and minimum elongation (2"), 17 percent.

The physical characteristics of these new high tensile strength materials further permit working stresses of up to 30,000 p.s.i. or more in contrast to 12,000 p.s.i. for ordinary steel, thus enabling the weight of material required for a given design requirement to be reduced to less than half. A further advantage of this new material is that it can be welded to itself with an electrode of the same material without adversely affecting its physical properties, and the weld needs no further heat treatment, i.e., annealing or stress relieving, in order to conform to engineering standards.

The structural advantages of this new material stimulated man's imagination. However, before the manufacturers of large machines could properly avail themselves of the advantageous properties of this new material, a serious problem needed to be solved. This problem, which has long confronted the manufacturers of large machines, arises from the assembly of the machines themselves. Too often an entire machine cannot be transported to the customer in its assembled condition because of the limited capacities of the known means of transportation, i.e., the machines are just too big. Consequently, many machines must be transported to the customer, i.e., "to the field," in a disassembled condition, and the machine must then be assembled in the field. Field assembly becomes a source of irritation and difficulty in that much of the equipment often necessary for fabrication is not readily available in the field. Some of its is not available at all. Welding devices, such as submerged arc welding machines, stress relieving and annealing equipment, such as large furnaces, tempering devices, etc., of adequate capacity are practicably impossible to have available in the field. Thus, the problem of obtaining shop quality in field fabrication operations confronted the industry.

Heretofore, the industry has attempted to overcome this problem by either one of two "solutions." One solution was to have the stress relieving performed by improvised "substitutes" which provided a product found to be inferior to products which had been stress relieved in a shop furnace. A second solution was to omit stress relieving which resulted in a product which was unsalable to those customers, such as the United States Government, who will not accept equipment having field welded joints which have not been stress relieved. Obviously, both of these "solutions" leave much to be desired.

Being aware of the difficult problem of fabrication involved in the field assembly of heavy machinery and being particularly familiar with the problem as it relates to hydraulic turbines, I sought out a positive solution. The present invention is that solution.

During the course of my work, I became familiar with the new high tensile strength materials which I have previously described. I also discovered that when the elements to be joined were of different materials, one being of this high tensile strength material previously described and another being of ordinary carbon steel, it was necessary to devise means which would enable the joint or fabrication seam to meet all of the strength requirements of the engineering design and, at the same time, avoid the creation of excessive stresses in the joint and the unnecessary usage of quantities of material in excess of that required by the engineering design.

For example, in a hydraulic turbine, the stay ring, which is the internal part of the assembled scroll case to which the casing plates are welded, because of compressive and other unknown stresses transmitted thereto, is preferred made very rigid and massive. Consequently, it is usually made of ordinary rolled or cast steel. On the other hand, the casing plates are of such a nature that they are readily made of high tensile strength material, such as the aforementioned Carilloy T–1 steel. Strength is the prime consideration in casing plates and this type of material enables this requirement to be fulfilled while greatly reducing the total weight of the plates.

A specific form of the problem presents itself then in the determination of novel means for joining the heavy stay ring of a hydraulic turbine which is of ordinary steel and the casing plates when they are made of materials of the type of T–1 steel which will not exceed the permissible stress of 12,000 pounds per square inch in the welded seam or joint where the two materials meet.

Because of the strength per unit mass characteristics of the respective materials, a large cross section of ordinary carbon steel is required for the stay ring of a hydraulic turbine while only a relatively small cross section of the high tensile strength material is required for the scroll casing plates. Consequently, a size adaptation must be obtained through the welded seam or joint. Heretofore such joints have required a long, tedious and costly build-up process which was performed by the field welder (it being necessary, as we have seen, to weld in the field as the machine cannot be transported in its assembled state). This welding operation was generally done by hand. This problem is likewise solved by the present invention.

Accordingly, it is the primary object of the present invention to provide improved means for and an improved method of fabricating heavy metallic machine elements when one consists of a relatively higher grade material than the other with respect to its engineering properties and which overcomes the heretofore insurmountable obstacles of the prior art.

Another object of the present invention is to provide means for and a method of fabricating metallic machine elements which one of said elements consists of a high tensile strength, high yield strength structural material and the other consists of a material of relatively lower grade material with respect to engineering properties.

Another object of the present invention is to provide an improved article of manufacture which has greater strength per unit mass than similar prior art articles.

Another object of the present invention is to provide a method whereby large machines of superior quality may be fabricated in the field with a minimum amount of man hours and materials.

A further object of the present invention is to provide a method for joining large machine elements which eliminates the need for field annealing and field stress relieving the thus formed joint while maintaining the joint stresses within engineering defined limits.

A still further object of the present invention is to provide a means of and method for fabricating heavy articles which enables a more efficient and thorough construction of the machine.

Figure 2:
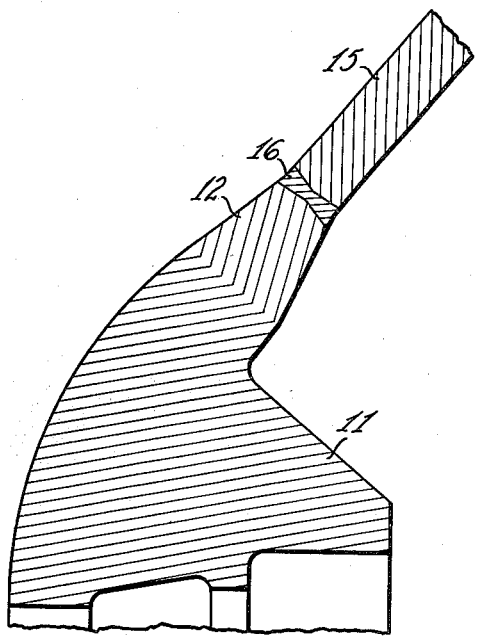

These and other objects are fulfilled by the present invention as will become apparent from the following detailed description when read in conjunction with the accompanying drawing in which like elements bear like numbers throughout, and:

Fig. 1 is a cross sectional view of a hydraulic turbine stay ring welded by conventional means to a transition piece of the present invention; and Fig. 2 is a cross sectional elevation of the stay ring and transition piece of Fig. 1 showing the weldment of the casing plate to the transition piece in accordance with the present invention.

The invention of the present application will be herein described in relation to a large hydraulic turbine although it is understood that its utility is not limited to hydraulic turbines, nor is the intended scope of this application so limited. Rather, a hydraulic turbine relationship is shown merely to exemplify a practical utilization of applicant's invention.

In Fig. 1, a hydraulic turbine stay ring 11 and a transition piece 12 of the present invention are shown welded together at 13 by any conventional means such as by submerged arc welding. This assembly, herein referred to as the stay-ring transition-piece assembly, is shown in Fig. 2 having the casing plate 15 welded to the transition piece 12 by any conventional means at 16 to provide a completely assembled machine.

In the fabrication of a hydraulic turbine and particularly the juncture of the stay ring and the scroll casing plates, the stay ring is usually composed of a lower grade material such as carbon steel, whereas the casing plates are herewith proposed composed of the high grade material herein exemplified by T-1 steel.

In the shop where submerged arc welding equipment and stress relieving furnaces are available, a small transition piece 12 of T-1 steel of say frustopyramidical structure is welded by any suitable means such as by submerged arc welding to the stay ring 11 at junction 13 to provide a welded assembly. Such stress relieving as is necessary for the welded assembly to meet specifications is then readily performed. The entire ring and transition piece can, for example, be placed in a large furnace where it will be uniformly and completely stress relieved.

The stress relieved stay-ring transition-piece assembly is then transported to the field, i.e., to the customer's installation, whereupon the field welder welds the high grade scroll casing plate 15 to the high grade transition piece 12 by any suitable means in a relatively simple manner. Applicant has found that a welded joint between a high grade material and a high grade material, such as that described at 16, requires no stress relieving and, consequently, all that is required in the field is a simple joint weld. This weld 16 may be of any suitable pattern such as the conventional V's or U's or J's in use today. It is preferred, however, that the electrode used for joining the high grade material to the high grade material be also of the same material.

Thus, a weld structure is formed comprising two pieces 11, 15, of metallic material, each of different engineering quality from the other, one 15 being of the new high tensile strength high yield strength material, and a transition piece 12 of the high grade material interposed therebetween. The transition piece 12 is of such a shape that it further provides a size adaptation, i.e., the cross sectional area of its end abutting the lower grade material substantially corresponding to the cross sectional area of the lower grade material and the cross sectional area of its end abutting the high grade material substantially corresponds to the cross sectional area of the high grade material. The transition piece 12 is further preferred gently tapered from end to end to provide a linear relationship therebetween for ease of preparation. This piece, however, may be of any suitable configuration within the intended scope of this invention, provided that the characterized cotransitionary nature is maintained.

It is understood that the foregoing illustrative description is intended to definitively exemplify applicant's invention and is no way intended to limit the scope thereof other than as it may be reflected in the terms of the claims appended hereto.

It is claimed and desired to secure by Letters Patent:

1. The method of fabricating adjacent large structural members to provide a joint therebetween in which the working stress does not exceed 12,000 p.s.i., one of the large structural members being formed of a high tensile strength structural material of the type having a composition consisting of 0.10 to 0.20 percent carbon, 0.60 to 1.30 percent manganese, up to 0.035 percent phosphorous, up to 0.040 percent sulfur, 0.15 to 0.35 percent silicon, 0.70 to 1.0 percent nickel, 0.40 to 0.80 percent chromium, 0.40 to 0.60 percent molybdenum, 0.03 to 0.10 percent vanadium, 0.15 to 0.50 percent copper, 0.002 to 0.006 percent boron, and the remainder essentially iron and characterized by a working stress on the order of 30,000 p.s.i. or more, the other of the large structural members being formed of ordinary carbon steel characterized by a working stress on the order of 12,000 p.s.i. comprising: providing a first welding surface on the one member formed of high tensile strength structural material; providing a second welding surface on the other member formed of ordinary carbon steel; providing a unitary transition member formed of said high tensile strength structural material for joining intermediate said first and second welding surfaces, said transition member having welding surfaces defined thereupon complementary to said first and second welding surfaces; abutting said second welding surface and the one of said complementary surfaces of said transition member to define an interface therebetween; fusing said transition member to said other of said members at said interface to form an integral assembly therewith; stress relieving said integral assembly; thereafter abutting said first welding surface and said other of said complementary surfaces to define an interface therebetween and fusing said transition member to said one of said members at said interface to form an integral stress free assembly therewith including the first mentioned stress relieved assembly.

2. The method of claim 1 wherein said first and said second welding surfaces are provided with substantially different areas and said transition member tapers from said one complementary surface having an area equal to said second welding surface to said other complementary surface having an area equal to said first welding surface.

3. The method of claim 2 in which the area of said first welding surface is smaller than the area of said second welding surface.

References Cited in the file of this patent

UNITED STATES PATENTS

| | | |
|---|---|---|
| 2,047,633 | Jacobus | July 14, 1936 |
| 2,232,656 | Davis | Feb. 18, 1941 |
| 2,396,704 | Kerr | Mar. 19, 1946 |
| 2,511,553 | Toops | Jan. 13, 1950 |
| 2,717,439 | Bergstrom | Sept. 13, 1955 |
| 2,763,923 | Webb | Sept. 25, 1956 |
| 2,770,030 | Carpenter et al. | Nov. 13, 1956 |

OTHER REFERENCES

Weldments designed and fabricated by Lukenweld, pp. 7, 9 and 13, published in 1946 by Lukenweld, Inc., Coatesville, Pa.

Metals Handbook, 1948 edition, pp. 376 and 534, published by The American Society for Metals, Cleveland 3, Ohio.